(12) United States Patent
Singh et al.

(10) Patent No.: US 8,620,323 B1
(45) Date of Patent: Dec. 31, 2013

(54) METHOD AND SYSTEM FOR SUPPORTING CALL ORIGINATION BEFORE SESSION ESTABLISHMENT

(75) Inventors: Jasinder P. Singh, Olathe, KS (US); Sachin R. Vargantwar, Overland Park, KS (US); Manoj Shetty, Overland Park, KS (US); Bhagwan Khanka, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 352 days.

(21) Appl. No.: 12/846,953

(22) Filed: Jul. 30, 2010

(51) Int. Cl.
  *H04W 36/00* (2009.01)
(52) U.S. Cl.
  USPC ........... 455/436; 455/437; 455/438; 455/439; 455/440; 455/441; 455/442; 455/443; 455/444
(58) Field of Classification Search
  USPC ................................................. 455/436–444
  See application file for complete search history.

(56) References Cited

U.S. PATENT DOCUMENTS

| | | | |
|---|---|---|---|
| 6,781,999 B2 | 8/2004 | Eyuboglu et al. | |
| 7,085,251 B2 | 8/2006 | Rezaiifar | |
| 7,346,033 B2 | 3/2008 | Chang et al. | |
| 8,285,289 B2 * | 10/2012 | Mooney et al. | 455/438 |
| 2002/0118656 A1 * | 8/2002 | Agrawal et al. | 370/329 |
| 2003/0135626 A1 * | 7/2003 | Ray et al. | 709/228 |
| 2005/0207368 A1 * | 9/2005 | Nam | 370/320 |
| 2005/0266847 A1 | 12/2005 | Tinnakornsrisuphap et al. | |
| 2006/0072506 A1 * | 4/2006 | Sayeedi et al. | 370/331 |
| 2006/0165038 A1 * | 7/2006 | Abrol et al. | 370/331 |
| 2007/0099621 A1 | 5/2007 | Bergqvist et al. | |
| 2007/0110071 A1 | 5/2007 | Rezaiifar et al. | |
| 2007/0140218 A1 * | 6/2007 | Nair et al. | 370/352 |
| 2008/0014943 A1 * | 1/2008 | Ahn et al. | 455/436 |
| 2008/0176569 A1 * | 7/2008 | Jung et al. | 455/436 |
| 2008/0267115 A1 | 10/2008 | Lv et al. | |
| 2010/0056150 A1 * | 3/2010 | Mooney et al. | 455/436 |
| 2010/0223388 A1 * | 9/2010 | Vadlapudi et al. | 709/228 |
| 2010/0322192 A1 * | 12/2010 | Takizawa et al. | 370/331 |

OTHER PUBLICATIONS

Joel Gross et al., "Method of Determining Secondary Color Code Assignment in an EVDO Network for Cross Border Session Renegotiation Elimination," IP.com No. IPCOM000183619D, published May 29, 2009.
Zhenqiang Ye et al., "Predictive channel reservation for handoff prioritization in wireless cellular networks," doi: 10.1016/j.comnet. 2006.06.007 (available online Jul. 18, 2006).
3rd Generation Partnership Project 2, "cdma2000 High Rate Packet Data Air Interface Specification," 3GPP2 C.S0024-A, Version 3.0 (Sep. 2006).

* cited by examiner

*Primary Examiner* — Liton Miah

(57) ABSTRACT

An access terminal establishes a session with a first radio access network (RAN). As a result, the access terminal receives a Unicast Access Terminal Identifier (UATI) assigned by the first RAN and establishes configuration settings for radio communications between the access terminal and the first RAN. The access terminal moves from the first RAN to a second RAN. Before the access terminal has a session established with the second RAN, the access terminal receives a request from a user to originate a call. In response, the access terminal sends the second RAN a connection request that includes the UATI assigned by the first RAN. The second RAN evaluates the UATI included in the connection request and determines that it was previously assigned to the access terminal by another RAN. Based on this determination, the second RAN grants the connection request by assigning a traffic channel to the access terminal.

13 Claims, 3 Drawing Sheets

US 8,620,323 B1

METHOD AND SYSTEM FOR SUPPORTING CALL ORIGINATION BEFORE SESSION ESTABLISHMENT

BACKGROUND

The air interface communications between an access terminal and a radio access network (RAN) may be organized into a protocol stack with a number of different layers. Each layer may perform certain defined functions and may include a defined set of one or more protocols for performing its respective functions. Typically, the lowest layer of the protocol stack is a Physical Layer that defines the frequencies, channel structure, modulation, encoding, etc. used for the wireless communications. Above the Physical Layer, the protocol stack may include a Medium Access Control (MAC) Layer that defines the procedures used to transmit and receive over the "physical layer." Above the MAC Layer, the protocol stack may include a Connection Layer that controls the use of air interface resources, such as forward traffic channels and reverse traffic channels. Above the Connection Layer, the protocol stack may include a Session Layer that is used to establish and maintain a session between an access terminal and a RAN.

An example of such a protocol stack is described in the specifications for Evolution Data-Optimized (EVDO) communications. In the EVDO approach, an access terminal uses Session Layer protocols to establish a session with a RAN and is then able to use Connection Layer protocols to obtain traffic channels. To establish a session with the RAN, an access terminal may request the RAN to assign it a Unicast Access Terminal Identifier (UATI). The access terminal may also negotiate configuration settings for the session, which may be used for subsequent radio communications between the access terminal and the RAN. Once the session is established, the access terminal may request traffic channels by transmitting a ConnectionRequest message to the RAN that includes the UATI that the RAN assigned to the access terminal.

Overview

In a first principal aspect, an exemplary embodiment provides a method for an access terminal. The access terminal establishes a session with a first radio access network (RAN), wherein establishing the session with the first RAN comprises the access terminal receiving a first terminal identifier assigned by the first RAN and negotiating first-RAN configuration settings for radio communications between the access terminal and the first RAN. The access terminal moves from the first RAN to the second RAN. Before the access terminal has a session established with the second RAN, the access terminal (i) receives a request to originate a call, (ii) engages in radio communications with the second RAN to request air interface resources for the call, wherein the radio communications with the second RAN comprise the access terminal transmitting the first terminal identifier to the second RAN, and (iii) receives a traffic channel assignment from the second RAN.

In a second principal aspect, an exemplary embodiment provides a method in which: (a) a first radio access network (RAN) establishes a session with an access terminal, wherein establishing the session comprises the first RAN assigning a terminal identifier to the access terminal to the access terminal and negotiating first-RAN configuration settings for radio communications between the access terminal and the first RAN; (b) the first RAN makes a determination that the access terminal has moved into an area that borders a second RAN; and (c) in response to the determination, the first RAN transmits the terminal identifier to the second RAN.

In a third principal aspect, an exemplary embodiment provides a method for supporting radio communications between a RAN and an access terminal that has not established a session with the RAN. The RAN receives from the access terminal a request for air interface resources. The request includes a terminal identifier that was not assigned by the RAN. The RAN determines that the terminal identifier in the request was previously assigned to the access terminal. The RAN grants the request by assigning a traffic channel to the access terminal.

DETAILED DESCRIPTION OF EXEMPLARY EMBODIMENTS

1. Introduction

Figure 1:
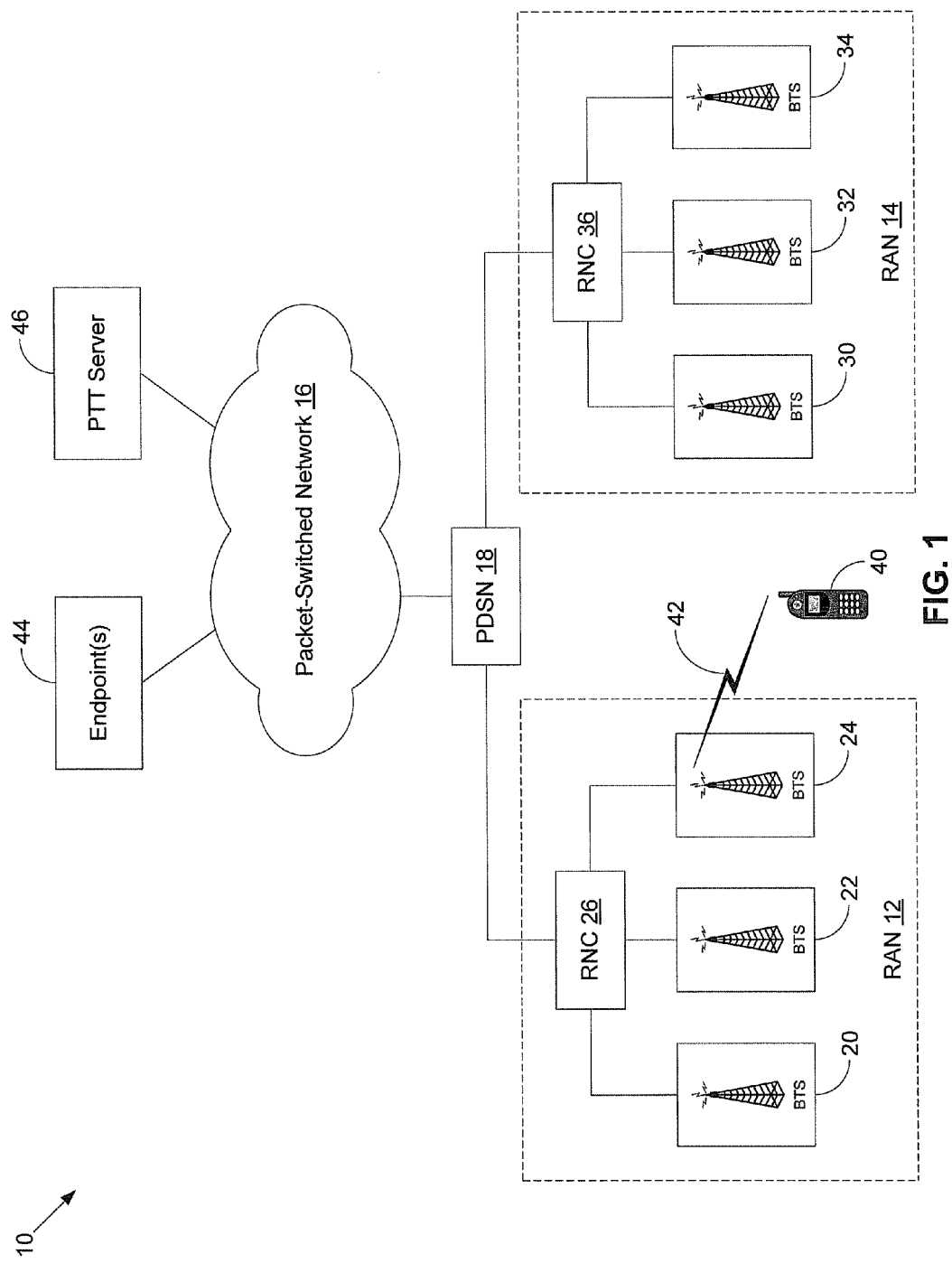
FIG. 1 is a block diagram of a wireless telecommunications system, in accordance with an exemplary embodiment.

The inventors propose methods and systems for supporting communications between a radio access network (RAN) and an access terminal that has not established a session with the RAN. To support communications in such situations, the RAN may grant a request from an access terminal (e.g., a request for air interface resources) based on the access terminal presenting a terminal identifier, such as a Unicast Access Terminal Identifier (UATI), that was previously assigned to the access terminal by another RAN.

For example, an access terminal may establish a session with a first RAN. That process may involve the access terminal receiving a terminal identifier assigned by the first RAN and negotiating configuration settings for radio communications between the access terminal and the first RAN. The access terminal may subsequently move to a second RAN. Before the access terminal has established a session with the second RAN, the access terminal may receive a request from a user to originate a call. Rather than going through the process of first establishing a session with the second RAN, the access terminal may transmit to the second RAN a request for air interface resources for the call (e.g., a connection request) and may include in the request a terminal identifier assigned to the access terminal by the first RAN. The second RAN may evaluate the request to determine whether the terminal identifier was previously assigned to the access terminal by another RAN. If the second RAN determines that the terminal identifier was previously assigned to the access terminal, the second RAN may grant the request by assigning a traffic channel for the call. Otherwise, the second RAN may deny the request.

The second RAN may determine whether the terminal identifier presented by the access terminal was previously assigned to the access terminal in various ways. In one approach, the second RAN may have already received from the first RAN the terminal identifier that the first RAN assigned to the access terminal. For example, the first RAN may detect when the access terminal moves into an area that borders the second RAN. In response, the first RAN may transmit to the second RAN the terminal identifier that the first RAN assigned to the access terminal and the configuration settings that the access terminal and first RAN negotiated for the session. Thereafter, when the access terminal moves to the second RAN and transmits the terminal identifier to the second RAN, the second RAN may determine that the terminal identifier presented by the access terminal corresponds to the terminal identifier that was previously provided by the first RAN. Based on this correspondence, the second RAN may determine that the terminal identifier presented by the access terminal was previously assigned to the access terminal by the first RAN. The second RAN may then grant the access terminal's request for air interface resources.

Other approaches for determining whether a terminal identifier presented by an access terminal was previously assigned to the access terminal do not rely on communications between RANs. For example, when an access terminal transmits to a RAN a terminal identifier that was previously assigned to it by another RAN, the access terminal may also transmit an indication that the terminal was previously assigned. The indication could be, for example, a one-bit flag that is set to indicate a previously-assigned terminal identifier. Alternatively, the indication could be provided by the access terminal as an identifier type code, as an alphanumeric description, or could be provided in some other form. The indication may also include other information, such as an identification of the RAN that assigned the terminal identifier to the access terminal and/or the date and time that the terminal identifier was assigned. The RAN receiving the terminal identifier and indication from the access terminal may determine from the indication that the terminal identifier was previously assigned and, as a result, grant the access terminal's request for air interface resources.

In yet another approach, a RAN receiving a terminal identifier from an access terminal may be able to determine from the terminal identifier itself that it was previously assigned. For example, part of the terminal identifier may correspond to an identifier of the RAN that assigned it. Thus, a RAN receiving a terminal identifier from an access terminal may detect that the terminal identifier includes a valid identifier of another RAN (such as a neighboring RAN) and, on that basis, determine that the other RAN previously assigned the terminal identifier to the access terminal. As a result, the RAN may grant the access terminal's request for air interface resources.

In this way, an access terminal may beneficially gain access to a RAN's air interface resources without first establishing a session with the RAN, so as to be able to originate a call more quickly. This can be particularly advantageous for latency-sensitive calls, such as push-to-talk (PTT) calls.

2. Exemplary Network Architecture

FIG. 1 illustrates a wireless telecommunications system 10 in which exemplary embodiments may be employed. Wireless telecommunications system 10 includes a plurality of radio access networks (RANs), as exemplified in FIG. 1 by RAN 12 and RAN 14. RANs 12 and 14 may provide access to one or more other networks, such as packet-switched networks (e.g., the Internet) and/or circuit-switched networks (e.g., the public switched telephone network). For purposes of illustration, FIG. 1 shows RANs 12 and 14 communicatively coupled to a packet-switched network 16 via a packet data serving node (PDSN) 18. It is to be understood, however, that RAN 12 and/or RAN 14 could be communicatively coupled to other types of networks and could be communicatively coupled to packet-switched network 16 in other ways.

In an exemplary embodiment, each of RANs 12 and 14 includes one or more wireless access points, such as base transceiver stations (BTSs), and is controlled by a respective radio network controller (RNC). For purposes of illustration, FIG. 1 shows RAN 12 with BTSs 20, 22, and 24 that are controlled by RNC 26, and shows RAN 14 with BTSs 30, 32, and 34 that are controlled by RNC 36, with RNCs 26 and 36 communicatively coupled to PDSN 18. It is to be understood, however, that RAN 12 and/or RAN 14 could be configured differently. For example, RAN 12 and RAN 14 could include a greater or fewer number of BTSs and could include one or more control elements in addition to or instead of RNCs 26 and 36.

Each BTS in RAN 12 and RAN 14 may include a wireless coverage area within which the BTS is able to wirelessly communicate with one or more access terminals. The wireless coverage of a BTS could be, for example, a cell, which could, in turn, be directionally divided into a plurality of sectors. For purposes of illustration, FIG. 1 shows an access terminal 40 in communication with BTS 24 of RAN 12 via an air interface 42. Access terminal 40 could be, for example, a wireless telephone, a wireless personal digital assistant (PDA), a wirelessly equipped laptop or handheld computer, or other wireless communication device. In an exemplary embodiment, BTS 24 and access terminal 40 communicate over air interface 42 using EVDO. It is to be understood, however, that other air interface protocols could be used.

By communicating over air interface 42, access terminal 40 may communicate with one or more endpoints via RAN 12 and packet-switched network 16. Such endpoints, which are exemplified in FIG. 1 by endpoint(s) 44, may include, for example, e-mail servers, messaging servers, media servers, gaming servers, or other terminals (such as landline telephones or wireless communication devices). Access terminal 40 and endpoint(s) 44 may engage in communication sessions, which may involve the exchange of voice, video, data, and/or other media. Thus, as one example, access terminal 40 could become engaged in a voice call, such as a voice-over-Internet-protocol (VoIP) call, with a landline station or with another access terminal. As another example, access terminal 40 could become engaged in a data call with a media server to receive streaming audio and/or video.

In an exemplary embodiment, access terminal 40 includes a push-to-talk (PTT) application, such as a QChat client, that enables access terminal 40 to engage in PTT calls. To originate a PTT call to one or more endpoints, such as one or more other access terminals, access terminal 40 may communicate with a PTT server 46 via packet-switched network 16. PTT server 46 may, in turn, set up the PTT call to the one or more endpoints designated by access terminal 40.

In order to engage in PTT calls or other types of communication sessions, access terminal 40 may first request a traffic channel assignment, i.e., an assignment of a dedicated forward traffic channel and a dedicated reverse traffic channel. Access terminal 40 may do so by transmitting to the RAN a connection request or other type of request (depending on the air interface protocol being used). In many cases, access terminal 40 will have already established a session with the RAN, so the RAN will be able to recognize the access terminal 40 and will be able to apply configuration settings that that access terminal 40 previously negotiated with the RAN.

In some cases, however, access terminal 40 may transmit a connection request to a RAN before access terminal 40 has established a session with the RAN. This may occur, for example, when access terminal 40 establishes a session with a first RAN (e.g., RAN 12) and then moves to a second RAN (e.g., RAN 14). After moving to the second RAN, access terminal 40 may wait a predetermined period of time before establishing a session with the second RAN in order to avoid "ping pong" signaling that may occur if access terminal 40 moves back and forth between the wireless coverage areas of the two RANs. Before access terminal 40 has established a session with the second RAN, access terminal 40 may receive a request from a user to originate a call, such as a PTT call. In response, access terminal 40 may transmit a connection request and include in the request the terminal identifier that the first RAN assigned to access terminal 40 when its session with the first RAN was established. As described in more detail below, even though access terminal 40 has not established a session with the second RAN, the second RAN may grant the request based on the terminal identifier having been previously assigned to access terminal 40 by the first RAN.

3. Exemplary Methods

Figure 2:
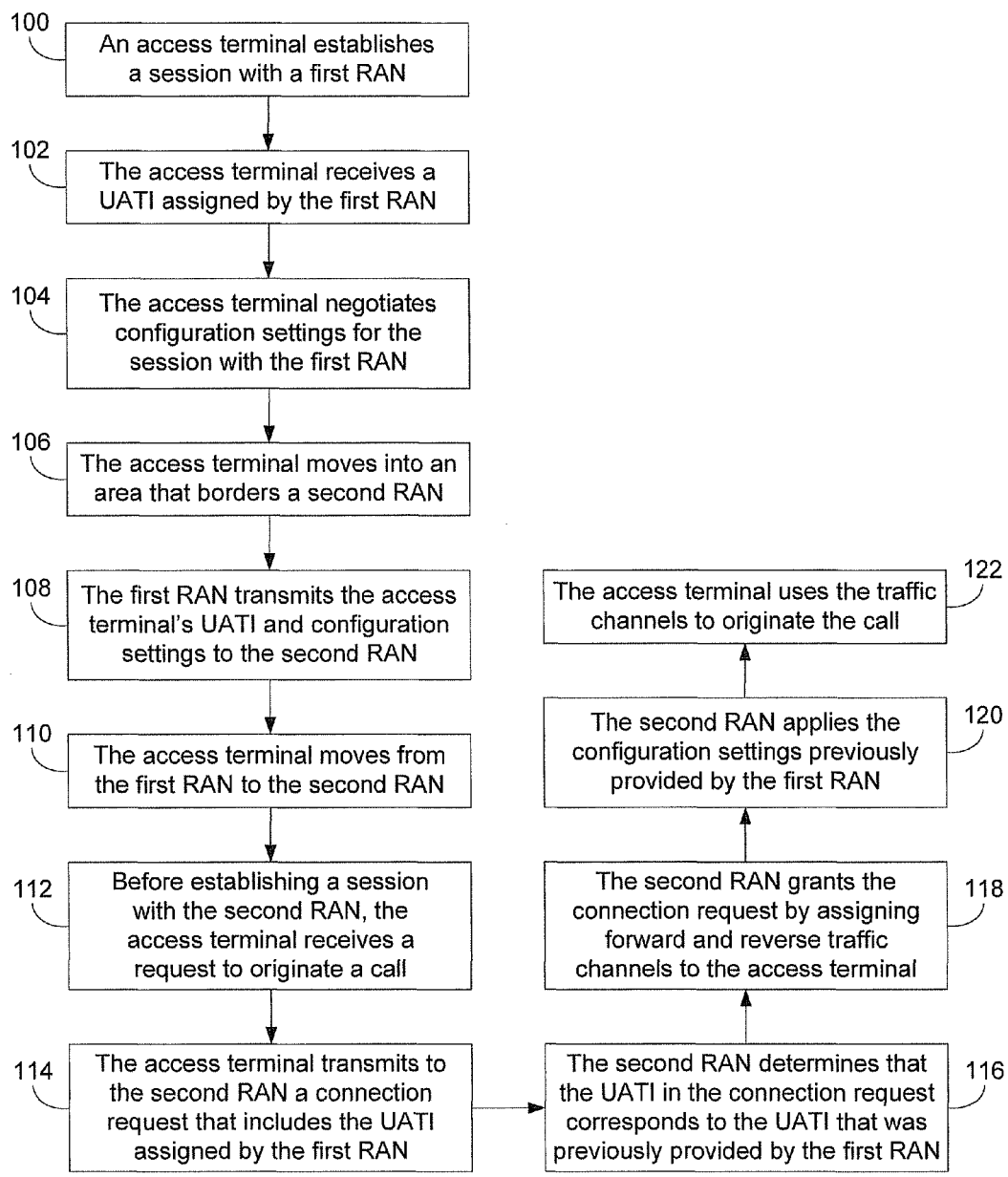
FIG. 2 is a flow chart illustrating a method for supporting communications by an access terminal in a second RAN based on a terminal identifier assigned to the access terminal by a first RAN, in accordance with an exemplary embodiment.

FIG. 2 is a flow chart illustrating an exemplary method of using a terminal identifier assigned to an access terminal by a first RAN to support communications in a second RAN. For purposes of illustration, the terminal identifier is described as a Unicast Access Terminal Identifier (UATI), in accordance with EVDO nomenclature. It is to be understood, however, that other air interface protocols and other types of terminal identifiers could be used. In addition, while FIG. 2 is described with reference to the network architecture shown in FIG. 1, other network architectures could be used.

The method of FIG. 2 begins when an access terminal (e.g., access terminal 40) establishes a session with a first RAN (e.g., RAN 12), as indicated by block 100. The process of establishing a session may involve several stages. In the first stage, the access terminal receives a UATI assigned by the first RAN, as indicated by block 102. In the EVDO approach, this may occur by the access terminal transmitting a UATIRequest message to the first RAN and, in response, receiving a UATIAssignment message that includes the UATI assigned by the first RAN.

In the second stage, the access terminal negotiates configuration settings for the session with the first RAN, as indicated by block 104. These configuration settings may include parameters and/or profiles that the access terminal and first RAN will apply for subsequent radio communications between them. In the EVDO approach, these configuration settings may be negotiated by the access terminal transmitting one or more ConfigurationRequest messages to the first RAN and receiving one or more ConfigurationResponse messages.

At some point, the access terminal may move into an area that borders a second RAN, as indicated by block 106. For example, access terminal 40 may move into an area served by BTS 24 in RAN 12 that borders an area served by BTS 30 in RAN 14. The border area could be defined in various ways, for example, as one or more cells, sectors, or portions thereof.

When the first RAN detects that the access terminal has moved into an area bordering the second RAN, the first RAN may respond proactively to prepare for the possibility that the access terminal may subsequently move from the first RAN to the second RAN. For example, the first RAN may transmit the access terminal's UATI and configuration settings to the second RAN, as indicated by block 108. The transmission of this information may occur through communication between the first and second RAN's respective RNCs. Thus, RNC 26 may transmit the access terminal's UATI and configuration settings to RNC 36. RNC 36 may, in turn, store this information for a certain period of time, for example, based on a lifetime of the access terminal's session with the first RAN, which may be indicated by RNC 26.

In the example of FIG. 2, the access terminal moves from the first RAN to the second RAN, as indicated by block 110. The access terminal may be configured to wait for a predetermined period of time before establishing a session with the second RAN. In this example, however, the access terminal receives a request from a user to originate a call before the access terminal has established a session with the second RAN, as indicated by block 112.

In response to the user's request, the access terminal could go through the process of establishing a session with the second RAN before originating the call. However, for at least certain types of calls (e.g., PTT calls or other latency-sensitive calls), the access terminal may instead seek to originate the call before establishing a session with the second RAN. To do this, the access terminal may transmit to the second RAN a connection request that includes the UATI assigned by the first RAN, as indicated by block 114. The connection request may include one or more communications that the access terminal uses to request air interface resources (such as traffic channels) for the call. For example, in the EVDO approach, the connection request may include a ConnectionRequest message.

The second RAN receives the connection request and determines that the UATI in the connection request corresponds to the UATI that was previously provided by the first RAN, as indicated by block 116. As a result, the second RAN grants the connection request by assigning forward and reverse traffic channels to the access terminal, as indicated by block 118. For the radio communications with the access terminal, the second RAN may apply the configuration settings that were previously provided by the first RAN, as indicated by block 120. Similarly, the access terminal may continue to apply the configuration settings that it previously negotiated with the first RAN. At this point, the access terminal may use the traffic channels to originate the call, as indicated by block 122. For example, to originate a PTT call, the access terminal may transmit a message to PTT server 46 designating one or more endpoints for the call.

In this way, the access terminal may be able to use the second RAN to originate a call without first establishing a session with the second RAN. It is to be understood, however, that the access terminal may subsequently establish a session with the second RAN, for example, once the call has been set up. By establishing a session with the second RAN, the access terminal may receive a new UATI assigned by the second RAN. In addition, the access terminal may negotiate new configuration settings for the session with the second RAN.

In the example of FIG. 2, the second RAN was able to recognize the UATI in the access terminal's connection request as being a previously-assigned UATI because the second RAN had already received the access terminal's UATI from the first RAN. In other examples, however, the second RAN may recognize a UATI as being a previously-assigned UATI in other ways. For example, the access terminal may indicate to the second RAN that its UATI was previously assigned. This approach is illustrated in FIG. 3.

Figure 3:
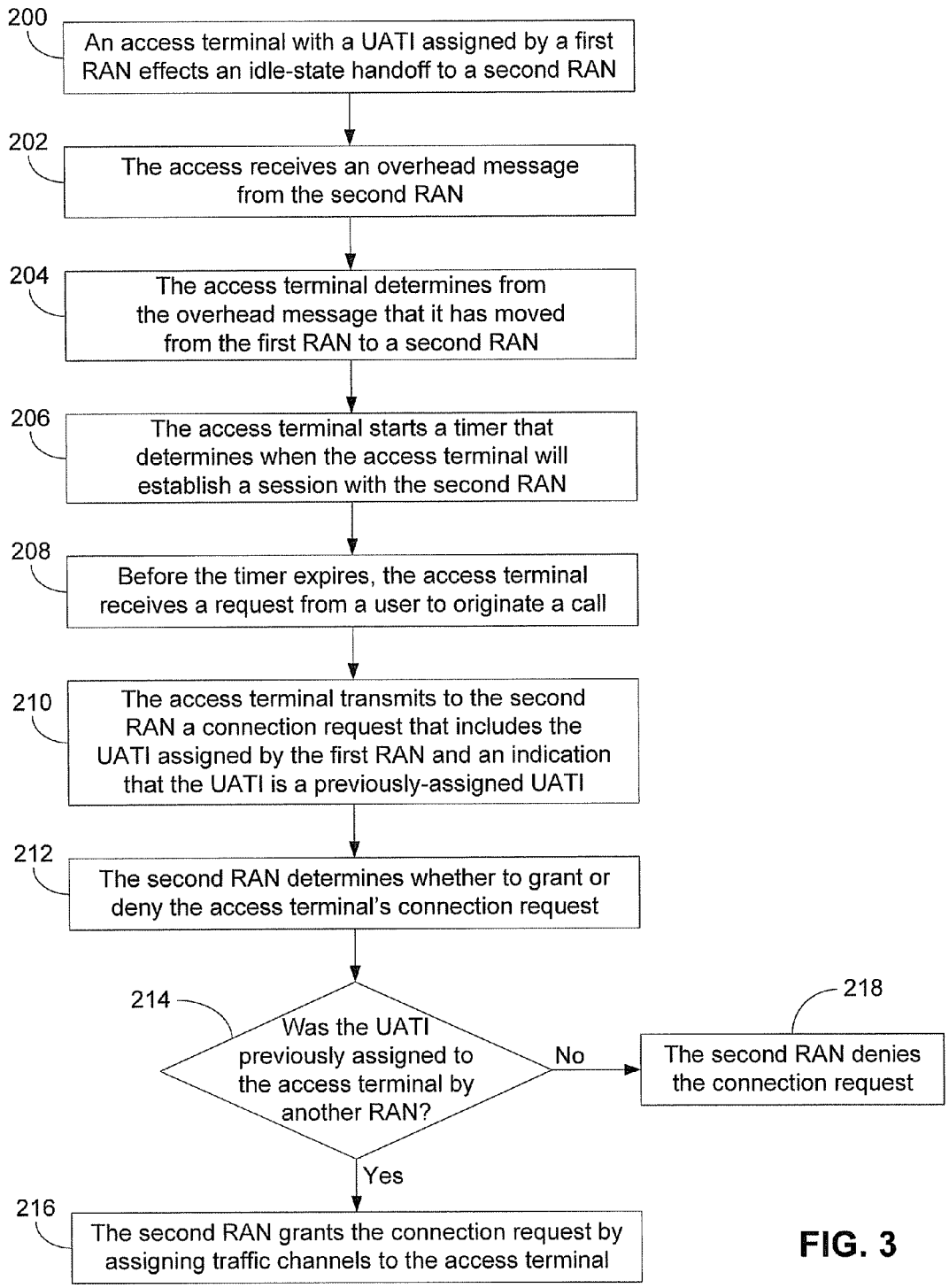
FIG. 3 is a flow chart illustrating a method for supporting communications by an access terminal in a second RAN based on a terminal identifier assigned to the access terminal by a first RAN, in accordance with an exemplary embodiment.

In the example of FIG. 3, an access terminal that has a UATI assigned to it by a first RAN effects an idle-state handoff to a second RAN, as indicated by 200. Thus, in this example, the access terminal is not involved in a call when it moves from the first RAN to the second RAN. Instead, the access terminal monitors signal strengths while in an idle state and detects a stronger signal from the second RAN. As a result, the access terminal begins monitoring a paging or control channel of the second RAN instead of the first RAN.

By monitoring a paging or control channel of the second RAN, the access terminal may receive an overhead message from the second RAN, as indicated by block 202. For example, in the EVDO approach, the overhead message could be a QuickConfig message or SectorParameters message transmitted on a control channel of the second RAN. The access terminal may determine from the overhead message that it has moved from the first RAN to a second RAN, as indicated by block 204. For example, the overhead message from the second RAN may include a color-code or other identifier of the second RAN that is different than that of the first RAN. By detecting a different color-code (or other type of RAN or subnet identifier), the access terminal may determine that it has moved to a different RAN.

In response to determining that it has moved to a second RAN, the access terminal may start a timer that determines when the access terminal will establish a session with the second RAN, as indicated by block 206. In this example, the access terminal is configured to wait until the timer expires before establishing a session with the second RAN. This approach may beneficially avoid "ping pong" signaling that may occur if the access terminal is operating at the border of two different RANs.

Before the timer expires (i.e., before the access terminal has established a session with the second RAN), the access terminal receives a request from a user to originate a call, as indicated by block 208. In response, the access terminal transmits to the second RAN a connection request that include the UATI assigned by the first RAN and an indication that the UATI is a previously-assigned UATI, as indicated by block 210.

The second RAN determines whether to grant or deny the access terminal's connection request, as indicated by block 212. The second RAN may make this determination based, at least in part, on whether the UATI in the connection request was previously assigned to the access terminal by another RAN, as indicated by block 214. Thus, if the second RAN determines that the UATI in the access terminal's connection request was previously assigned to the access terminal, the second RAN may grant the connection request by assigning traffic channels to the access terminal, as indicated by block 216. Otherwise, the second RAN may deny the connection request, as indicated by block 218.

If the second RAN does grant the connection request by assigning traffic channels to the access terminal, the access terminal may then use the traffic channel assignment to originate the call. The access terminal and second RAN may initially use default configuration settings for the radio communications between the second RAN and the access terminal. At some point, however, the second RAN and access terminal may negotiate new configuration settings, or the second RAN may query the first RAN to obtain the configuration parameters that the access terminal negotiated with the first RAN.

With reference to block 214 of FIG. 3, the second RAN may determine that the UATI in the access terminal's connection request was previously assigned to the access terminal based, at least in part, on the indication contained in the connection request that the UATI is a previously-assigned UATI. In some implementations, the presence of the indication may be sufficient for the second RAN to conclude that the UATI was, in fact, previously assigned to the access terminal. In other implementations, the second RAN may do a further check. As one example, the second RAN may also require the UATI to contain a color-code or other identifier of a neighboring RAN in order to conclude that the UATI was previously assigned to access terminal. As another example, the second RAN may use the indication as a trigger to check stored UATIs that the second RAN received from neighboring RANs (e.g., in accordance with the methods shown in FIG. 2). Thus, even with the presence of the indication in the connection request, the second RAN may require the UATI in the access terminal's connection request to match a UATI that was previously received from another RAN in order to conclude that the UATI in the connection request was, in fact, previously assigned to the access terminal. In addition to these examples, the second RAN could perform other types of checks to determine whether the UATI was previously assigned to the access terminal.

It is to be understood that the foregoing approaches for determining whether a UATI in an access terminal's connection request message was previously assigned to the access terminal by another RAN are exemplary only, as other approaches could be used. For example, the UATI may include a RAN-specific portion that identifies the RAN that assigned it (e.g., a color-code of the RAN that assigned the UATI). Thus, when a RAN receives from an access terminal a connection request containing a UATI that was not assigned by the RAN, the RAN may be able to parse the RAN-specific portion to determine whether it identifies a valid RAN (such as a neighboring RAN). The RAN receiving the access terminal's connection request may, on that basis, determine that the UATI in the connection request was previously assigned to the access terminal. Other approaches could also be used.

In this way, an access terminal may be able to transmit a connection request to a RAN before establishing a session with the RAN and have the RAN grant the connection request based, at least in part, on the access terminal presenting a UATI that was previously assigned to it by another RAN. Consequently, an access terminal that has moved to a new RAN may beneficially be able to originate calls, such as PTT calls, more quickly.

4. Conclusion

Exemplary embodiments of the present invention have been described above. Those skilled in the art will understand, however, that changes and modifications may be made to these embodiments without departing from the true scope and spirit of the invention, which is defined by the claims

What is claimed is:
1. A method for an access terminal, comprising:
said access terminal establishing a session with a first radio access network (RAN), wherein establishing said session with said first RAN comprises said access terminal receiving a first terminal identifier assigned by said first RAN and negotiating first-RAN configuration settings for radio communications between said access terminal and said first RAN;
said access terminal moving from said first RAN to a second RAN; and
before said access terminal has a session established with said second RAN, said access terminal (i) receiving a request to originate a call, (ii) engaging in radio communications with said second RAN to request air interface resources for said call, wherein said radio communications with said second RAN comprise said access terminal transmitting said first terminal identifier, an indication that said first terminal identifier is a previously-assigned terminal identifier, and a date and time that said first terminal identifier was previously assigned to said access terminal to said second RAN, and (iii) receiving a traffic channel assignment from said second RAN.

2. The method of claim 1, wherein said first terminal identifier is a Unicast Access Terminal Identifier (UATI).

3. The method of claim 1, wherein said access terminal moving from said first RAN to a second RAN comprises said access terminal effecting an idle-state handoff from said first RAN to said second RAN.

4. The method of claim 1, wherein said access terminal moving from said first RAN to a second RAN comprises said access terminal receiving an overhead message from said second RAN, said overhead message including a color-code of said second RAN that is different than that of said first RAN.

5. The method of claim 1, wherein receiving a request to originate a call comprises receiving a request from a user of said access terminal to initiate a push-to-talk (PTT) call.

6. The method of claim 1, wherein said radio communications with said second RAN comprise said access terminal transmitting a connection request to said second RAN.

7. The method of claim 1, further comprising:
said access terminal using said traffic channel assignment to originate said call.

8. The method of claim 7, further comprising:
said access terminal applying default configuration settings for said call.

9. The method of claim 7, further comprising:
said access terminal applying said first-RAN configuration settings for said call.

10. The method of claim 9, wherein said second RAN receives said first-RAN configuration settings from first RAN before receiving said first terminal identifier from said access terminal.

11. The method of claim 1, further comprising:
after receiving said traffic channel assignment from said second RAN, said access terminal receiving a second terminal identifier assigned by said second RAN.

12. The method of claim 1, further comprising:
after receiving said traffic channel assignment from said second RAN, said access terminal establishing second-RAN configuration settings for radio communications between said access terminal and said second RAN.

13. The method of claim 1, wherein said radio communications with said second RAN further comprise said access terminal transmitting an identification of said first RAN as having previously assigned said first terminal identifier to said access terminal.

\* \* \* \* \*